Nov. 2, 1965  E. C. BRIGGS  3,215,351
OIL BURNER NOZZLE
Filed June 4, 1963
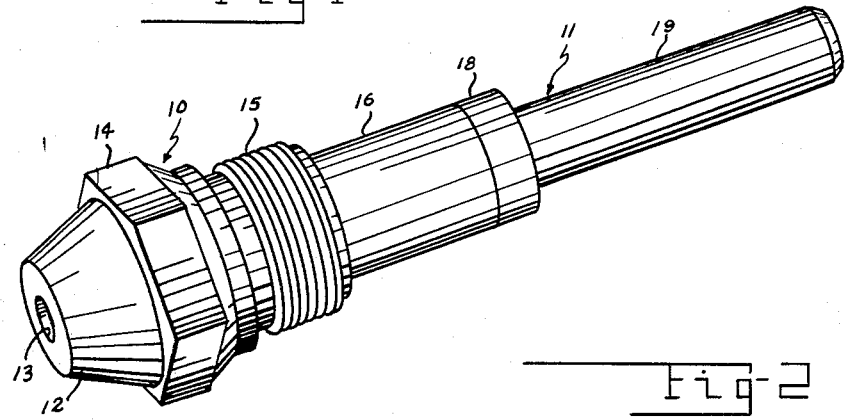
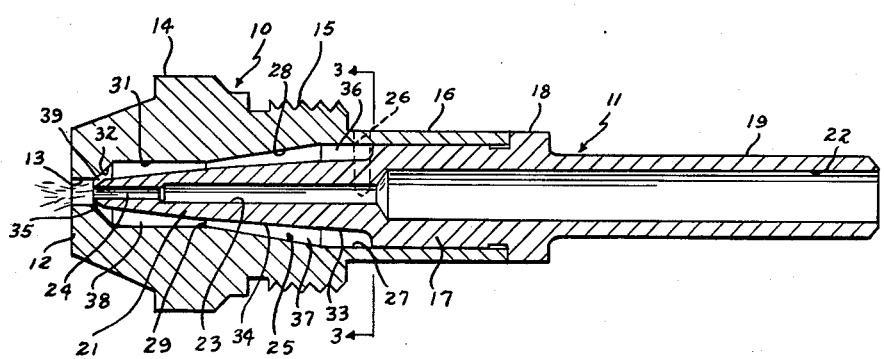
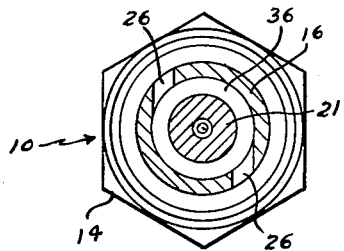
INVENTOR.
EUGENE C. BRIGGS
BY Tom Walker
ATTORNEY

United States Patent Office 3,215,351
Patented Nov. 2, 1965

3,215,351
OIL BURNER NOZZLE
Eugene C. Briggs, Dayton, Ohio, assignor to Master Consolidated, Inc., Dayton, Ohio, a corporation of Ohio
Filed June 4, 1963, Ser. No. 285,511
1 Claim. (Cl. 239—406)

This invention relates to nozzles for use with aspirating type oil burners wherein the aspirating air reduces the flowing fuel to a combustible spray.

The object of the invention is to simplify the construction as well as the means and mode of operation of oil burner nozzles, whereby such nozzles may not only be economically manufactured, but will be more efficient and satisfactory in use, adaptable to a wide variety of application, and be unlikely to get out of order.

A further object of the invention is to provide a nozzle especially characterized by simplicity of construction, its design permitting manufacture entirely by automatic screw machines, obviating milling and like process steps.

Another object of the invention is to present a generally new nozzle of the class described wherein a desired relatively high velocity air flow is achieved without high pressure drop requirements inhering in devices imposing a high degree of restriction to air flow.

A further object of the invention is to utilize a principle of vortex flow of the air in an aspirating nozzle as described.

Still another object of the invention is to provide a new mode of cooperation between body and fuel inlet tube components of a nozzle wherein the parts cooperate to achieve successively in the flow of air under pressure a swirling motion thereof under conditions of progressive restriction, an expansion of the swirling air and an angularly directed discharge thereof under conditions of restriction.

FIG. 1 is a view in perspective of a nozzle in accordance with the illustrated embodiment of the invention;

FIG. 2 is a view in longitudinal section of the nozzle of FIG. 1; and

FIG. 3 is a view in cross-section taken substantially along the line 3—3 of FIG. 2.

Referring to the drawings, a nozzle in accordance with the illustrated embodiment of the invention comprises a body component 10 and an inlet tube component 11 assembled in an inter-engaged, unitary relation. The body component 10 is generally tubular and hollow, being open at its one end and closed at its opposite end by a transverse wall 12. In the latter is a through opening 13 coaxial with the longitudinal axis of the body 10. Inwardly of the wall 12, or to the right thereof as viewed in FIG. 2, the body 10 is formed with an external hexagonal flange 14 constituting a wrench gripping portion for installation and removal of the nozzle. Beyond flange 14 is an external screw threaded portion 15, the latter terminating in a relatively elongated cylindrical shank portion 16.

The first mentioned or open end of the body 10 is adapted to receive the inlet tube 11 therein, the tube having intermediate its ends a cylindrical portion 17 adapted for a press fit in body extension 16. A flange 18 on the tube 11 limits against the extremity of body extension 16. Extending in one direction from cylindrical portion 17 and flange 18 is a tubular portion 19 adapted for attachment, as through flexible hose means, with a fuel storage tank. Projecting in the opposite direction from cylindrical portion 17, or within the body component 10 is an extension portion 21. Tube 11 is coaxially disposed of the body component 10 and the inner end or tip of tube extension 21 extends to and approximately within the opening 13. A relatively large diameter inlet bore 22 in tube 19 is connected through an intermediate bore 23 of smaller diameter to an orifice-like outlet passage 24 immediately communicating with opening 13.

The interior wall of body component 10 and the exterior of tube extension 21 are spaced from one another to define an annular chamber 25 supplied with air under pressure through one or more (in the present instance two) laterally disposed body openings 26. The latter communicate with chamber 25 at what may be considered the inner end thereof immediately adjacent the inner extremity of cylindrical portion 17 of tube 11. The openings 26 are moreover, tangentially disposed relative to the chamber 25 in such manner that incoming air is directed in a circular path about the tube extension 21. The opposing, cooperating surfaces of the body 10 and tube extension 21 are formed to achieve in conjunction with the tangential air admission certain predetermined air flow characteristics. Thus, the interior surface of body 10 is formed in the region of the air inlet 26 with a cylindrical surface 27. This surface is relatively short in length and terminates in a more elongated conical surface 28 tapering toward the body axis. The conical surface 28 is truncated at a location 29 where it merges with a divergent surface 31 which is in the present instance parallel to the body axis. Surface 31 in turn terminates near end wall 12 in a short length bevel or inclined surface 32 connecting surface 31 to the periphery of body opening 13.

The tube extension 21 is formed at its base end or adjacent to cylindrical portion 17 with a cylindrical surface 33 laterally aligned with and approximately coextensive in length with cylindrical body surface 27. The surface 33 ends in the base of a conical surface 34 tapering progressively toward the end thereof where it terminates in a short length bevel portion 35 disposed in a generally opposing relation to the surface 32 of body 10.

According to the construction and arrangement of parts, therefore, the body 10 and tube projection 21 cooperate in the defining of an annular chamber 25 which is characterized by a cylindrical portion 36 in the region of air inlet 26, a conical portion 37, beyond portion 36, terminating in a restriction at location 29, an expansion chamber 28 and an angularly directed relatively restricted outlet 39. The tangential arrangement of the openings 26 sets up a rotary flow of air in the chamber 36. Entering conical chamber 37 swirling motion of the air flow continues accompanied by an increase in velocity as surfaces 28 and 34 gradually reduce in diameter. At the frustrum of the conical chamber, as represented by location 29, the fluid flow is restricted and enters expansion chamber 38 under conditions of continuing velocity. Chamber 38 effectively provides a reservoir of pressure under fluid for supply to the outlet 39, and, in addition provides space for the flow to effect a change in direction as required by sloping surface 32. The air is throttled at the exit passage 39 and discharges in jet-like fashion through opening 13 in a manner to reduce pressure at the end of orifice passage 24 of the fuel tube. This vacuum lifts the fuel from the storage tank to the nozzle and mixes it with the high velocity swirling air discharging through opening 13. The result is that there is discharged from the nozzle tip a combustible spray of air and atomized fuel, the spray angle being determined by the inclination of sloping surfaces 32 and 35 on the body and tube respectively.

Opening 13 may be considered a discharge or orifice opening, serving by its selected diameter to control and direct the emitting spray. The oil flow is metered by the diameter of the orifice passage 24. Air is supplied to the nozzle from an air pump or the like. In accordance with a feature of the invention this pressure may be relatively low, as on the order of 2 to 4 pounds per square inch. In this same connection the air flow passages all are relatively large in area, the necessary velocity required for a forceful spray emission from the discharge opening 13 being provided for by the induced vortex movement of the air around tube extension 21.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprises but one of several modes of putting the invention into effect, and the invention is therefore claimed in any of its forms or modifications within the legitimate and valid scope of the appended claim.

Having thus described my invention, I claim:

A nozzle for an atomizer or like burner, including body and fuel inlet tube components, the latter having a through longitudinal passage of orifice-like size, said tube being received within the body and having an inner end and an outer end, said outer end communicating with a source of liquid fuel, said body having a discharge opening aligned with said inner end, said body and said tube defining an annular chamber about said tube in said body, and dual inlet means for introducing air under pressure to said chamber tangentially thereof, the air flowing in a vortex to said discharge opening, said fuel inlet tube having an inwardly converging outer surface which continues to converge inwardly in moving toward said inner end to form a tip at the inner end thereof, said body having an inner surface which initially converges toward said converging outer surface of said inlet tube and in the direction of said discharge opening to form a restriction defined by the converging inner surface of said body and the outer surface of said inlet tube, said inner surface of said body then diverging outwardly from the outer surface of said inlet tube and in the direction of said discharge opening to form an expansion chamber defined by the diverging relationship of said surfaces of said body and inlet tube, said inner surface of said body then sharply inwardly converging to connect with said discharge opening, said inner end of said tube being bevelled sharply inwardly at the tip thereof, said bevelled portion being located closely adjacent and substantially parallel to said sharply inwardly converging surface of said body to define therebetween an inwardly directed restricted passage leading to said discharge opening, the air discharging in jet-like fashion from said restricted passage angularly across the axis of said longitudinal passage in said tube to induce the flow of fuel from said tube by reducing the pressure at the inner end of said tube in said orifice-like passage, the fuel and air mixture thus produced then flowing outwardly through said discharge opening.

References Cited by the Examiner

UNITED STATES PATENTS

| | | | |
|---|---|---|---|
| 1,066,161 | 7/13 | Stilz | 239—404 |
| 1,678,459 | 7/28 | Bowland | 239—403 |
| 1,692,853 | 11/28 | Mulholland | 239—406 |
| 1,811,637 | 6/31 | Ladisch | 239—406 |
| 2,325,495 | 7/43 | Ferguson | 158—76 X |

FOREIGN PATENTS

| | | |
|---|---|---|
| 926,438 | 4/47 | France. |
| 723,478 | 2/55 | Great Britain. |
| 867,727 | 5/61 | Great Britain. |

EVERETT W. KIRBY, *Primary Examiner.*

RAPHAEL M. LUPO, *Examiner.*